(12) United States Patent
Takahashi et al.

(10) Patent No.: US 9,450,246 B2
(45) Date of Patent: Sep. 20, 2016

(54) CARBON PARTICLES FOR NEGATIVE ELECTRODE OF LITHIUM ION SECONDARY BATTERY, NEGATIVE ELECTRODE FOR LITHIUM ION SECONDARY BATTERY, AND LITHIUM ION SECONDARY BATTERY

(75) Inventors: Teppei Takahashi, Hitachi (JP); Yoshito Ishii, Mito (JP); Keiji Okabe, Hitachi (JP); Yuriko Ida, Mito (JP); Nobushige Nakamura, Hitachi (JP)

(73) Assignee: HITACHI CHEMICAL COMPANY, LTD., Tokyo (JP)

(*) Notice: Subject to any disclaimer, the term of this patent is extended or adjusted under 35 U.S.C. 154(b) by 0 days.

(21) Appl. No.: 13/503,879

(22) PCT Filed: Oct. 20, 2010

(86) PCT No.: PCT/JP2010/068488
§ 371 (c)(1),
(2), (4) Date: Apr. 25, 2012

(87) PCT Pub. No.: WO2011/052452
PCT Pub. Date: May 5, 2011

(65) Prior Publication Data
US 2012/0219863 A1    Aug. 30, 2012

(30) Foreign Application Priority Data

Oct. 27, 2009 (JP) ................. P2009-246798

(51) Int. Cl.
| | | |
|---|---|---|
| H01M 4/583 | (2010.01) | |
| H01M 4/587 | (2010.01) | |
| C01B 31/04 | (2006.01) | |
| H01M 10/0525 | (2010.01) | |

(52) U.S. Cl.
CPC .............. *H01M 4/587* (2013.01); *C01B 31/04* (2013.01); *H01M 10/0525* (2013.01)

(58) Field of Classification Search
CPC ............................. H01M 4/583; H01M 4/587
USPC ..................................................... 429/231.8
See application file for complete search history.

(56) References Cited

U.S. PATENT DOCUMENTS

| | | | | |
|---|---|---|---|---|
| 6,139,990 | A * | 10/2000 | Kubota ............. | C01B 31/04 423/445 R |
| 6,344,296 | B1 * | 2/2002 | Ishii ............... | C01B 31/04 423/445 R |
| 7,311,998 | B1 * | 12/2007 | Sada ............... | H01M 4/0416 429/231.8 |
| 7,563,543 | B2 * | 7/2009 | Tenno .............. | C01B 31/04 429/209 |
| 2005/0158550 | A1 * | 7/2005 | Ohta ............... | H01M 4/587 428/407 |
| 2009/0181311 | A1 * | 7/2009 | Iwanaga ............ | H01M 4/131 429/331 |
| 2009/0280413 | A1 * | 11/2009 | Ohta ............... | C01B 31/04 429/231.8 |

FOREIGN PATENT DOCUMENTS

| | | |
|---|---|---|
| CN | 1230159 A | 9/1999 |
| CN | 1391708 A | 1/2003 |
| CN | 1577923 A | 2/2005 |
| CN | 101461088 A | 6/2009 |
| EP | 1939971 A1 | 7/2008 |
| JP | 62-23433 | 5/1987 |
| JP | 10-236809 | 9/1998 |
| JP | 2000-294243 | 10/2000 |
| JP | 2005-50807 | 2/2005 |
| JP | 3787030 | 3/2006 |
| JP | 2007-39289 | 2/2007 |
| JP | 2007-324067 | 12/2007 |
| JP | 4064351 B2 | 3/2008 |
| JP | 2009-238584 | 10/2009 |
| KR | 100793691 B1 | 1/2008 |
| WO | WO 2008/026380 A1 | 3/2008 |

OTHER PUBLICATIONS

International Preliminary Patentability Report of Application No. PCT/2010/068488 dated Jun. 21, 2012, in English.
CN Office Action of Appln. No. 201080048216.5 dated Dec. 25, 2013 with English translation.
Taiwan Office Action of Appln. No. 10321211720 dated Aug. 29, 2014 with English translation.
Office action of CN Appln. No. 201080048216.5 dated Aug. 13, 2014 with English translation.
JP Office Action of Appln. No. 2011-538369 dated Jul. 29, 2014 with English translation.
Search Report of EP Appln. No. 10826584.4 dated Jun. 10, 2016 in English.
Office Action of JP Appln. No. 2015-094812 dated Jun. 7, 2016 with English translation.

* cited by examiner

*Primary Examiner* — Patrick Ryan
*Assistant Examiner* — Kiran Akhtar
(74) *Attorney, Agent, or Firm* — Fitch, Even, Tabin & Flannery, LLP

(57) ABSTRACT

Disclosed are carbon particles for a negative electrode of a lithium ion secondary battery, the carbon particles having a pore volume of pores having a size of $2\times10$ to $2\times10^4$ Å, of 0.1 ml/g or less with respect to the mass of the carbon particles; having an interlayer distance d(002) of a graphite crystal as determined by an X-ray diffraction analysis, of 3.38 Å or less; having a crystallite size Lc in the C-axis direction of 500 Å or more; and having a degree of circularity of the particle cross-section in the range of 0.6 to 0.9. Therefore, the carbon particles for the negative electrode of the lithium ion secondary battery enables to have high capacity and have superior rapid charge characteristics, a negative electrode for a lithium ion secondary battery using the carbon particles, and a lithium ion secondary battery can be provided.

16 Claims, No Drawings

CARBON PARTICLES FOR NEGATIVE ELECTRODE OF LITHIUM ION SECONDARY BATTERY, NEGATIVE ELECTRODE FOR LITHIUM ION SECONDARY BATTERY, AND LITHIUM ION SECONDARY BATTERY

TECHNICAL FIELD

The present invention relates to carbon particles for a negative electrode of a lithium ion secondary battery, a negative electrode for a lithium ion secondary battery, and a lithium ion secondary battery.

More particularly, the present invention relates to a negative electrode for a lithium ion secondary battery, which is suitable for the use in a portable equipment, an electric vehicle, an electric power storage and the like, and has high capacity and excellent rapid charge characteristics, and a lithium ion secondary battery using the negative electrode.

BACKGROUND ART

In regard to the active material for a negative electrode of a lithium ion secondary battery, metals, graphite and the like have been hitherto investigated as candidates. A metal electrode has a problem that when charging and discharging is repeated, lithium precipitates out in a dendrite form on the electrode and eventually causes a short circuit of both electrodes. For that reason, attention is being paid to a carbon material, particularly graphite, which has no precipitation of metallic lithium during the charge-discharge process.

Examples of using graphite as the active material for negative electrodes include natural graphite particles, artificial graphite particles obtained by graphitizing cokes, artificial graphite particles obtained by graphitizing an organic polymer material, pitch or the like, graphite particles obtained by pulverizing those graphite particles, and the like. These graphite particles are mixed with an organic binder and an organic solvent and formulated into a graphite paste, this graphite paste is applied on the surface of a copper foil, the solvent is dried, the dried paste is molded, and thereby, the product is used as a negative electrode for a lithium ion secondary battery. When graphite is used in the negative electrode, the problem of internal short-circuit occurring due to lithium dendrites is solved, and an improvement of the charge-discharge characteristics is promoted (see, for example, Patent Literature 1).

However, natural graphite in which graphite crystals have developed, has a weak binding force between the layers of crystals in the C-axis direction, as compared with the binding in the plane direction of crystals. Accordingly, the binding between graphite layers is broken by pulverization, and so-called flake-shaped graphite particles having a large aspect ratio are obtained. Since the flake-shaped graphite particles have a large aspect ratio, when the graphite particles are kneaded with an organic binder and applied on a collector to produce an electrode, the flake-shaped graphite particles are likely to orient in the plane direction of the collector. As a result, there is a problem that the charge-discharge characteristics or rapid charge-discharge characteristics are prone to deteriorate.

In order to address this problem, spheroidized graphite obtained by modifying flake-shaped graphite to approximate a spherical shape, has been proposed (see, for example, Patent Literature 2). The charge-discharge characteristics are enhanced by applying a mechanical treatment to flake-shaped graphite and thereby spheroidizing the particles.

CITATION LIST

Patent Literatures

Patent Literature 1: Japanese Patent Application Publication No. 62-23433
Patent Literature 2: Japanese Patent No. 3787030

DISCLOSURE OF THE INVENTION

Technical Problem

However, the treatment described in Patent Literature 2 is a treatment characterized by repeatedly applying a weak force to the particles to an extent that the binding between graphite layers is not broken. Accordingly, the treated particles acquire a large number of pores having a size of $2\times10$ to $2\times10^4$ Å inside the particles. The inventors of the present invention have found that when the particles have a large number of pores having a size of $2\times10$ to $2\times10^4$ Å inside the particles, at the time of producing a negative electrode, an organic binder penetrates into these pores of the particles and decreases the electrical conductivity of the particles.

Furthermore, when the particles have a large number of pores having a size of $2\times10$ to $2\times10^4$ Å, the amount of the organic binder present between the particles is decreased, and there is a tendency that the adhesive strength between the graphite active material layer and the collector is decreased. Moreover, when the treatment described in Patent Literature 2 is used, flake-shaped graphite turns into spherical particles. When the particles become excessively spherical in shape, the contact between the particles becomes point contact, and the electrical conductivity tends to decrease. It has also been found through the investigation of the inventors, and the like that these occurrences have an adverse effect particularly on the rapid charge characteristics.

An object of the present invention is to provide carbon particles for a negative electrode of a lithium ion secondary battery, which particles have high capacity and have superior rapid charge characteristics, a negative electrode for a lithium ion secondary battery using the carbon particles, and a lithium ion secondary battery.

Solution to Problem

The inventors of the present invention conducted an investigation by producing various negative electrode materials for the use in lithium ion secondary batteries, and as a result, the inventors found that when carbon particles having a particular shape parameter and a particular crystal structure are used, the carbon particles in the state of being produced into a negative electrode exhibit a preferable volume and a preferable degree of circularity of the particle cross-section, and have high capacity and excellent rapid charge characteristics.

Specifically, it was found that in the conventional spheroidizing treatment of flake-shaped graphite, the particles acquire a large number of pores inside the particles, and as an organic binder component penetrates into the pores inside the particles, the electrical conductivity of the carbon particles tends to decrease. In addition, it was found that in the conventional method, the particles become excessively spherical in shape, the electrical conductivity between the particles tends to decrease. Thus, it was found that when the content of pores having a specific size in the carbon particles is adjusted to a certain level or lower, and the degree of circularity of the particle cross-section is adjusted to a certain range, the adverse effect of the spheroidizing treatment on the rapid charge characteristics can be avoided. The inventors thus achieved the present invention based on these findings.

That is, specifically, the present invention has features as described in the following items (1) to (8).

(1) Carbon particles for a negative electrode of a lithium ion secondary battery, the carbon particles having a pore volume of pores having a size of $2 \times 10$ to $2 \times 10^4$ Å, of 0.1 ml/g or less with respect to the mass of the carbon particles; having an interlayer distance d(002) of a graphite crystal as determined by an X-ray diffraction analysis, of 3.38 Å or less; having a crystallite size Lc in the C-axis direction of 500 Å or more; and having a degree of circularity of the particle cross-section in the range of 0.6 to 0.9.

(2) The carbon particles for the negative electrode of the lithium ion secondary battery as set forth in the item (1), wherein the carbon particles have an exothermic peak at a temperature in the range of 550° C. or higher to 650° C. or lower in a differential thermal analysis in an air stream, and have a peak area in the range of 100 μV·s/mg or larger to 2100 μV·s/mg or smaller at a rate of temperature increase of 5° C./min.

(3) The carbon particles for the negative electrode of the lithium ion secondary battery as set forth in the item (1) or (2), wherein the average particle size as measured with a laser diffraction type particle size distribution analyzer is in the range of 1 to 100 μm.

(4) The carbon particles for the negative electrode of the lithium ion secondary battery as set forth in any one of the items (1) to (3), wherein the $N_2$ specific surface area as determined by a nitrogen adsorption analysis at 77 K is 10 m²/g or less.

(5) The carbon particles for the negative electrode of the lithium ion secondary battery as set forth in any one of the items (1) to (4), wherein the bulk density is 0.7 g/ml or greater.

(6) The carbon particles for the negative electrode of the lithium ion secondary battery as set forth in any one of the items (1) to (5), wherein the true specific gravity is 2.2 or greater.

(7) A negative electrode for the lithium secondary battery, containing the carbon particles for the negative electrode of the lithium ion secondary battery as set forth in any one of the items (1) to (6).

(8) A lithium ion secondary battery having the negative electrode as set forth in the item (7) and a positive electrode containing a lithium compound.

Advantageous Effects of the Invention

According to the present invention, the carbon particles have high capacity, and at the time of producing a negative electrode, penetration of an organic binder into pores inside the carbon particles can be suppressed, so that a decrease in the electrical conductivity caused by an excessive addition of an organic binder can be suppressed. Furthermore, a reduction in the contact between the particles can be suppressed, and a decrease in the electrical conductivity between the particles can be suppressed. As a result, carbon particles for a negative electrode of a lithium ion secondary battery having excellent rapid charge characteristics can be obtained.

The disclosure of the present application is related to the subject matter described in Japanese Patent Application No. 2009-246798 filed on Oct. 27, 2009, the disclosure of which is incorporated herein by reference.

BEST MODES FOR CARRYING OUT THE INVENTION

The carbon particles for the negative electrode of the lithium ion secondary battery of the present invention has a pore volume of pores having a size of $2 \times 10$ to $2 \times 10^4$ Å, of 0.1 mug or less with respect to the mass of the carbon particles, has an interlayer distance d(002) of a graphite crystal as determined by an X-ray diffraction analysis, of 3.38 Å or less, has a crystallite size Lc in the C-axis direction of 500 Å or more, and has a degree of circularity of the particle cross-section in the range of 0.6 to 0.9.

The carbon particles used in the negative electrode are such that the pore volume of pores having a size of $2 \times 10$ to $2 \times 10^4$ Å is preferably 0.1 ml/g or less, more preferably 0.08 ml/g or less, and even more preferably 0.04 ml/g or less, with respect to the mass of the carbon particles. When the carbon particles are used in the negative electrode of the lithium ion secondary battery, it is difficult for an organic binder to penetrate into the pores inside the particles, and the rapid charge characteristics of lithium ion secondary batteries can be enhanced.

The pore volume can be determined by a pore size distribution analysis according to a mercury intrusion method (for example, Autopore 9520 manufactured by Shimadzu Corporation) using the carbon particles of the present invention. The size of the pores can also be found by the pore size distribution analysis according to a mercury intrusion method.

Meanwhile, the reference size of the pore volume is defined as $2 \times 10$ to $2 \times 10^4$ Å because reducing those pores having a small pore volume is effective in enhancing the rapid charge characteristics.

In the present invention, in order to adjust the pore volume of the carbon particles to the range described above, the adjustment can be made through a pressurization treatment, modification by a mechanical treatment, a coating treatment, or the like.

Furthermore, in the method for adjusting the pore volume of pores having a size of $2 \times 10$ to $2 \times 10^4$ Å to be 0.1 ml/g or less with respect to the mass of the carbon particles, the carbon particles adjusted by a coating treatment described below have a main feature of having an exothermic peak at a temperature in the range of 550° C. to 650° C. in a differential thermal analysis in an air stream. As will be described below, it originates from the fact that the carbon particles having the exothermic peak are obtained by applying an appropriate carbon-coating treatment to graphitaceous particles serving as cores. When low-crystalline carbon is used in the "carbon-coating treatment", the carbon particles acquire the exothermic peak described above.

Furthermore, it is most preferable to adjust the area of the exothermic peak in the range of 100 μV·s/mg or larger to 2100 μV·s/mg or smaller.

In addition, a coating treatment of adjusting the pore volume of pores having a size of $2 \times 10$ to $2 \times 10^4$ Å to be 0.1 ml/g or less with respect to the mass of the carbon particles, can also be carried out using carbon materials other than low-crystalline carbon. However, for example when the coating treatment is carried out using a resin, the exothermic peak in a differential thermal analysis in an air stream lies in a range different from the range of 550° C. to 650° C.

When the area of the exothermic peak is 100 μV·s/mg or larger, there is a tendency that sufficient adhesiveness to the negative electrode collector may be obtained. Furthermore, when the area is 2100 μV·s/mg or less, an increase in the irreversible capacity tends to be suppressed.

The area of the exothermic peak is more preferably in the range of 200 to 2100 μV·s/mg, and even more preferably in the range of 1100 to 2100 μV·s/mg, from the viewpoint of decreasing the pore volume.

The coating treatment for adjusting the pore volume may include, for example, attaching an organic compound which leaves carbonaceous matter by a heat treatment (carbon precursor) to the surfaces of the carbon particles, and then modifying the surfaces by calcination (converting to low-crystalline carbon). There are no particular limitations on the method of attaching an organic compound to the surfaces of the carbon particles, but examples include a wet system in which carbon particles (powder) that serve as cores are dispersed and mixed into a mixed solution obtained by having an organic compound dissolved or dispersed in a solvent, and then the solvent is removed; a dry system in which carbon particles and an organic compound are mixed in the solid state, and then attached to each other by applying mechanical energy to the mixture; a gas phase system such as a method of mixing carbon particles and an organic compound in the solid state and calcining the mixture in an inert atmosphere, and a CVD method; and the like.

Examples of the material used in the coating include petroleum pitch, naphthalene, anthracene, phenanthroline, coal tar, phenolic resins, polyvinyl alcohol, and the like.

In order to have an exothermic peak at a temperature in the range of 550° C. to 650° C. in a differential thermal analysis in an air stream, and to obtain an area of the exothermic peak in the range of 100 μV·s/mg or larger to 2100 μV·s/mg or smaller at a rate of temperature increase of 5° C./min, for example, the amount of coating may be adjusted. That is, if the amount of coating is large, the area of the exothermic peak tends to increase.

Usually, the electrode material of the lithium ion secondary battery is used after being processed by mixing the electrode material with a solvent and an organic binder to form a slurry, applying the slurry on a copper foil or the like as a collector, drying the solvent, and molding the dried material. In this case, for example, since flake-shaped graphite that has a low degree of circularity has a plate-like shape, its fluidity at the time of mixing with a solvent and a binder is poor, the density of the negative electrode for a lithium ion secondary battery to be produced has a large fluctuation, and the adhesiveness to the negative electrode collector tends to decrease. As a result, there is a tendency that the charge-discharge characteristics of a lithium ion secondary battery thus obtainable deteriorate.

On the other hand, spherical particles having a value of the degree of circularity close to 1 are such that if the particles become excessively spherical, the contact between the particles become point contact, and the electrical conductivity tends to decrease. Furthermore, the contact area between the particles tends to decrease due to the expansion and contraction of the particles as a result of repeated occlusion and release of lithium to/from graphite crystals. As a result, there is a tendency that the spherical particles may have an adverse effect on the charge-discharge characteristics.

Therefore, according to the present invention, when the degree of circularity of the carbon particles is adjusted in the range of 0.6 to 0.9, the contour of the cross-section image of the particles in a state of being produced into a negative electrode for a lithium ion secondary battery, acquires a shape approximating a pseudo-polygon. Thereby, the contact area between the carbon particles increases, and a shape which can easily maintain the electrical conductivity between the carbon particles can be obtained. As a result, when such a shape is adopted, the contact area between the carbon particles does not decrease, and satisfactory charge-discharge characteristics may be obtained.

The degree of circularity of the carbon particles of the present invention is measured in the following manner. First, images of the particle cross-sections are taken, and the degree of circularity is determined by the following expression.

Degree of circularity=(Circumferential length of equivalent circle)/(circumferential length of the particle cross-section image)

Here, the term "equivalent circle" means a circle having the same area as that of the particle cross-section image. The circumferential length of the particle cross-section image means the length of the contour line of the particle cross-section image taken. The degree of circularity according to the present invention is an average degree of circularity obtained by magnifying a particle image to a magnification of 1000 times with a scanning electron microscope, selecting any arbitrary 10 carbon particles, measuring the degrees of circularity of the individual carbon particles by the method described above, and determining an average value thereof. In regard to the method of taking a carbon particle cross-section image in the case where the carbon particles have been produced into a negative electrode, a sample electrode is produced, the electrode is embedded in an epoxy resin, subsequently the electrode is mirror-surface polished, and an observation is performed using a scanning electron microscope.

A sample electrode according to the present invention is produced as follows. First, to a mixture comprising 97 parts by mass of carbon particles as a negative electrode material and 3 parts by mass of a polyvinylidene fluoride resin as an organic binder, as a solid component, N-methyl-2-pyrrolidone is added so as to adjust the viscosity of the mixture at 25° C. to 1500 to 2500 mPa·s, to prepare a coating material. Subsequently, this coating material is applied on a 10-μm thick copper foil to be a thickness of about 70 μm (at the time of being applied), and then the coating material is dried for one hour at 120° C. to obtain a sample electrode.

The method for measuring the viscosity is as described below. The viscosity is measured using a viscometer (manufactured by Brookfield Engineering Laboratories, Inc., product name: DV-III Spindle: SC4-18 #14) at a speed of rotation of 100 rpm and at a temperature of 25° C.

The circumferential length of the equivalent circle and the circumferential length of the particle cross-section image can be determined by, for example, an analysis program attached to a scanning electron microscope.

In regard to the shape of the particle cross-section, it is preferable that the carbon particles for the negative electrode of the lithium ion secondary battery of the present invention have linear portions in the contour line, and have a non-spherical shape having acute angles or obtuse angles. Furthermore, in connection with the preferred shape as described above, the shape of the particle cross-section may also include a contour line having dents or curved portions. When the carbon particles have a degree of circularity in the range described above, the contact area between the carbon particles in the state of being produced into a negative electrode increases, and the contact area does not significantly change even after repeated occlusion and release of lithium ions. Accordingly, it is believed that the electrical conductivity between the carbon particles can be easily maintained, and satisfactory rapid charge characteristics may be obtained.

According to the present invention, in order to obtain a degree of circularity of the carbon particles in the range of 0.6 to 0.9, spheroidized natural graphite or spheroidized artificial graphite having a degree of circularity in the range of 0.9 to 1.0 is used as the raw material for the carbon particles, and the degree of circularity can be adjusted by subjecting the graphite that is used as the raw material of the carbon particles to a modification treatment as will be described below. Meanwhile, spheroidized natural graphite or spheroidized artificial graphite having a degree of circularity in the range of 0.9 to 1.0, which is used as the raw material of the carbon particles, is obtained by subjecting flat-shaped natural graphite particles such as the particles of flake-shaped natural graphite or scale-shaped natural graphite, or artificial graphite particles, to a mechanical treatment for the modification treatment as will be described below.

According to the present invention, the interlayer distance d(002) of a graphite crystal of the carbon particles is a value calculated from a wide-angle X-ray diffraction analysis of the carbon particles used in the negative electrode for the lithium ion secondary battery, and this value is adjusted to 3.38 Å or less. The interlayer distance is more preferably in the range of 3.35 to 3.37 Å. If the value of d(002) exceeds 3.38 Å, the discharge capacity tends to decrease. There are no particular limitations on the lower limit value of d(002), the theoretical value of d(002) of a pure graphite crystal is usually considered to be 3.35 Å or greater.

Specifically, the measurement of d(002) of the carbon particles of the present invention is calculated, using Bragg's equation, from the diffraction peak corresponding to the carbon d(002) plane appearing in the vicinity of diffraction angle 2θ=24° to 26° in a diffraction profile which is obtained by irradiating the carbon particles with an X-ray (CuKα ray) and measuring the diffracted radiation with a goniometer.

According to the present invention, in order to obtain a value of d(002) of the carbon particles of 3.38 Å or less, it is desirable to use natural graphite, which has high crystallinity, or to use an artificial graphite which has been treated to increase the crystallinity. In order to increase the crystallinity, for example, the artificial graphite may be subjected to a heat treatment at a temperature of 2000° C. or higher.

Furthermore, the crystallite size Lc in the C-axis direction of the carbon particles is also a value calculated from a wide-angle X-ray diffraction analysis, and if this value is less than 500 Å, the discharge capacity tends to decrease. Therefore, the carbon particles used in the negative electrode for the lithium ion secondary battery of the present invention has an Lc value of 500 Å or more There are no particular limitations on the upper limit value of Lc, but the upper limit is usually considered to be 10000 Å or less.

The measurement of Lc of the carbon particles of the present invention is carried out by using a conventional method, but specifically, the measurement is carried out in the following manner. The size of a crystallite, Lc, is calculated based on the JSPS (Japan Society for the Promotion of Science) method using a wide-angle X-ray diffraction analyzer.

Furthermore, in order to obtain an Lc value of the carbon particles of the present invention of 500 Å or greater, it is desirable to use natural graphite, which has high crystallinity, or to use an artificial graphite which has been treated to increase the crystallinity. In order to increase the crystallinity, for example, the artificial graphite may be subjected to a heat treatment at a temperature of 2000° C. or higher.

The carbon particles of the present invention are such that the $N_2$ specific surface area determined from a nitrogen adsorption analysis at 77 K is preferably 10 $m^2/g$ or less, more preferably 6 $m^2/g$ or less, and even more preferably 4 $m^2/g$ or less. When such carbon particles are used in a negative electrode, the cycle characteristics of the resulting lithium ion secondary battery can be enhanced, and the irreversible capacity of the first cycle can be made small. If the specific surface area exceeds 10 $m^2/g$, the irreversible capacity of the first cycle of the resulting lithium ion secondary battery tends to increase, the energy density is small, and there is a tendency that a large amount of an organic binder is needed for the production of a negative electrode. From the viewpoint that more satisfactory cycle characteristics and the like of the resulting lithium ion secondary battery are obtained, the specific surface area is more preferably in the range of 0.3 to 4 $m^2/g$, and extremely preferably in the range of 0.3 to 2 $m^2/g$.

Measurement of the $N_2$ specific surface area determined from a nitrogen adsorption analysis at 77 K can be carried out by a method that is already known, such as a BET method (nitrogen gas adsorption method).

According to the present invention, in order to obtain a $N_2$ specific surface area of the carbon particles as determined from a nitrogen adsorption analysis at 77 K, of 10 $m^2/g$ or less, a mechanical surface modification treatment, a coating treatment, pulverization and the like may be carried out. Furthermore, when the particle size is made smaller, the specific surface area tends to be larger, and when the particle size is made larger, the specific surface area tends to be smaller.

The carbon particles of the present invention are such that the true specific gravity is preferably 2.2 or greater, and more preferably 2.200 to 2.270. If the true specific gravity is lower than 2.2, the charge-discharge capacity per unit volume of the lithium ion secondary battery is decreased, and the initial charge-discharge efficiency tends to decrease.

According to the present invention, the true specific gravity can be determined by a pycnometer method using butanol.

According to the present invention, in order to obtain a true specific gravity of the carbon particles of 2.2 or greater, a natural graphite which has high crystallinity, or an artificial graphite which has been treated to increase the crystallinity may be used. In order to increase the crystallinity, for example, the artificial graphite may be subjected to a heat treatment at a temperature of 2000° C. or higher.

The carbon particles of the present invention are such that the average particle size determined by a laser diffraction type particle size distribution meter is preferably in the range of 1 to 100 μm. The average particle size is more preferably in the range of 1 to 80 μm, and even more preferably in the range of 5 to 30 μm. If the average particle size is 100 μm or larger, when the carbon particles are prepared into a paste and applied, the coatability is poor, and the rapid charge-discharge characteristics tend to deteriorate. Further, if the average particle size is 1 μm or less, the carbon particles become particles that cannot efficiently participate in the electrochemical reaction with lithium ions, and the capacity and cycle characteristics tend to deteriorate.

According to the present invention, the measurement of the average particle size is calculated as 50% D when measured with a laser diffraction particle size distribution meter.

According to the present invention, in order to obtain an average particle size of the carbon particles in the range described above, particles having a desired size may be obtained by using, for example, a pulverizer or a sieve.

The bulk density of the carbon particles of the present invention is preferably 0.7 g/ml or greater. If the bulk density is less than 0.7 g/ml, a large amount of an organic binder is needed for the production of a negative electrode, and as a result, the energy density of the lithium ion secondary battery to be produced tends to decrease. There are no particular limitations on the upper limit value of the bulk density, but the upper limit is usually considered to be 1.5 g/ml or less.

The bulk density is a 30-times tapped density which can be calculated from the mass and volume of sample powders that are obtained after a process of slanting a graduated cylinder having a capacity of 100 ml, slowly introducing 100 ml of the sample powders into the graduated cylinder using a spoon, covering the graduated cylinder with a stopper, and then dropping the graduated cylinder 30 times from a height of 5 cm.

According to the present invention, in order to obtain a bulk density of the carbon particles in the range described above, particles having a desired size may be obtained by using, for example, a pulverizer or a sieve.

According to the present invention, it is desirable that carbon particles having an interlayer distance d(002) of a graphite crystal as determined from an X-ray diffraction analysis, of 3.38 Å or less, and a crystallite size Lc in the C-axis direction of 500 Å or more, may be obtained by using, for example, flat-shaped natural graphite particles such as the particles of flake-shaped natural graphite or scale-shaped natural graphite, and heat treating the graphite particles at 2000° C. or higher, and preferably at 2600° C. to 3000° C.

Furthermore, in order to adjust the degree of circularity of the carbon particles in the range of 0.6 to 0.9, and in order to adjust the average particle size and the pore volume of the carbon particles in the ranges of the present invention, the following modification treatment is carried out. First, flat-shaped natural graphite particles having an average particle size in the range of 1 to 100 µm and a degree of circularity in the range of 0.2 to 0.55 are used as a preferred raw material, and are subjected to a mechanical treatment. Thus, spheroidized natural graphite having the average particle size of the carbon particles adjusted in the range of 5 to 50 µm, and the degree of circularity adjusted in the range of 0.9 to 1.0, is obtained. The term mechanical treatment means a treatment of allowing the particles to collide with a part of the treatment apparatus or with each other.

Subsequently, the spheroidized natural graphite is pressure treated. The method of pressure treating the spheroidized natural graphite is not particular limited as long as the method is a method capable of applying pressure. Examples include pressure treatments such as hydrostatic pressure isotropic pressing in which the raw material graphite is introduced into a container such as a rubber frame, and water is used as a pressurizing medium; and pneumatic isotropic pressing in which gas such as air is used as a pressurizing medium. Further, the raw material graphite may be filled in a mold and subjected to a pressure treatment in a constant direction with a single-screw press.

The pressure of the pressurizing medium for the pressure treatment of the spherical natural graphite is preferably in the range of 50 to 2000 kgf/cm$^2$, more preferably in the range of 300 to 2000 kgf/cm$^2$, and even more preferably in the range of 500 to 1000 kgf/cm$^2$. If the pressure is less than 50 kgf/cm$^2$, the effect of enhancing the cycle characteristics of the resulting lithium ion secondary battery tend to be reduced. Furthermore, if the pressure is greater than 2000 kgf/cm$^2$, the specific surface area of the resulting carbon particles for the negative electrode of the lithium ion secondary battery is increased, and as a result, the irreversible capacity of the first cycle of the resulting lithium ion secondary battery tends to increase.

When spherical natural graphite is subjected to a pressure treatment as described above, the carbon particles thus obtainable are likely to aggregate with each other. Therefore, it is preferable to perform a treatment such as crushing or sieving after the pressure treatment. Meanwhile, if the carbon particles do not aggregate with each other, crushing may not be performed.

In regard to the negative electrode for the lithium ion secondary battery of the present invention, a negative electrode layer can be formed by mixing the carbon particles described above with an organic binder and a solvent or water, applying the mixture on a collector, drying the solvent or water, and pressing the dried mixture, and the negative electrode layer can be used as a negative electrode for a lithium ion secondary battery.

Examples of the organic binder that may be used include polymer compounds such as polyethylene, polypropylene, an ethylene-propylene rubber, a butadiene rubber, a styrene-butadiene rubber, carboxymethyl cellulose, polyvinylidene fluoride, polyethylene oxide, polyepichlorohydrin, and polyacrylonitrile; and the like. When the carbon particles are produced into a negative electrode using polyvinylidene fluoride or the like, which is hydrophobic and has high affinity with carbon particles, as the organic binder, the carbon particles for the negative electrode of the lithium ion secondary battery of the present invention exhibit more satisfactorily the effect of preventing the organic binder from penetrating into pores.

The mixing ratio of the carbon particles and the organic binder is preferably 1 to 20 parts by mass of the organic binder relative to 100 parts by mass of the carbon particles.

There are no particular limitations on the solvent to be used in the mixing of the carbon particles and the organic binder, and N-methylpyrrolidone, dimethylacetamide, dimethylformamide, γ-butyrolactone and the like are used.

As the collector, for example, a foil, mesh or the like of nickel, copper or the like can be used.

In regard to the negative electrode for the lithium ion secondary battery of the present invention, the density of the mixture layer (negative electrode layer) containing carbon particles and an organic binder on the collector is preferably in the range of 1.40 to 1.90 g/cm$^3$. The density is more preferably in the range of 1.45 to 1.80 g/cm$^3$, and even more preferably in the range of 1.50 to 1.70 g/cm$^3$.

When the density of the negative electrode layer containing carbon particles and an organic binder on the collector in the negative electrode of the present invention is made higher, the energy density per unit volume of the lithium ion secondary battery obtainable using this negative electrode can be increased higher. If the density of the negative electrode layer containing carbon particles and an organic binder is less than 1.40 g/cm$^3$, the energy density per unit volume of the lithium secondary battery thus obtainable tends to decrease. On the other hand, if the density of the negative electrode layer containing carbon particles and an organic binder is greater than 1.90 g/cm$^3$, injectability of the electrolyte liquid in the production of the lithium ion secondary battery tends to deteriorate, and also, the rapid charge-discharge characteristics and the cycle characteristics of the lithium ion secondary battery thus produced tend to deteriorate.

Here, the density of the negative electrode layer containing carbon particles and an organic binder can be calculated from the measured values of the mass and volume of the negative electrode layer containing carbon particles and an organic binder.

The density of the negative electrode containing carbon particles and an organic binder after the integration of the negative electrode layer with the collector, can be appropriately adjusted, for example, by the pressure applied at the time of integration molding; the clearance of the apparatus such as a roll press; or the like.

In order to obtain the lithium ion secondary battery of the present invention using the negative electrode thus obtained, for example, the negative electrode is arranged to face a positive electrode containing a lithium compound, with a separator interposed therebetween, and an electrolyte liquid is injected in. As the positive electrode containing a lithium compound, for example, $LiNiO_2$, $LiCoO_2$, $LiMn_2O_4$ and the like can be used singly or a mixture thereof. The positive electrode can be obtained by forming a positive electrode layer on the surface of a collector, similarly to the case of the negative electrode.

Furthermore, regarding the electrolyte liquid, use can be made of a solution obtained by dissolving, for example, a lithium salt such as $LiClO_4$, $LiPF_4$, $LiAsF$, $LiBF_4$, or $LiSO_3CF_4$ in, for example, ethylene carbonate, diethyl carbonate, dimethoxyethane, dimethyl carbonate, methyl ethyl carbonate, tetrahydrofuran, or the like. Furthermore, a so-called polymer electrolyte that is in the solid state or in a gel state can also be used instead of an electrolyte liquid.

As the separator, for example, a non-woven fabric, cloth, a microporous film, each of which may contain a polyolefin such as polyethylene or polypropylene as a main component, or combinations thereof can be used. Furthermore, a product prepared by applying an inorganic compound such as $SiO_2$ or $Al_2O_3$ on a separator as described above can also be used. Meanwhile, when the lithium ion secondary battery is produced to have a structure in which the positive electrode and the negative electrode are not brought into direct contact, a separator may not be used.

The structure of the lithium ion secondary battery of the present invention is not particularly limited, but usually, a positive electrode and a negative electrode, and a separator that is optionally provided are wound into a flat coil shape to obtain a spirally wound electrode group. Alternatively, it is general to adopt a structure in which these are laminated as a flat shape to obtain a laminated electrode group, and this electrode group is encapsulated in an outer packaging can.

Although not particularly limited, the lithium ion secondary battery of the present invention is used as a paper type battery, a button battery, a coin type battery, a laminated type battery, a cylinder type battery or the like.

EXAMPLES

Hereinafter, Examples of the present invention will be explained.

Example 1

(1) Production of Negative Electrode for Lithium Ion Secondary Battery

Spheroidized natural graphite (average particle size 22 μm, degree of circularity 0.95, specific surface area 5.0 m$^2$/g, true specific gravity 2.25, Lc>1000 Å, d(002) 3.354 Å, bulk density 0.72 g/ml) was filled in a container made of rubber and sealed. Next, the rubber container was subjected to an isotropic pressure treatment with a hydrostatic pressure press machine at a pressure of the pressurizing medium of 1000 kgf/cm$^2$. Subsequently, the graphite was crushed with a cutter mill, and thus carbon particles to be used in a negative electrode for a lithium secondary battery were obtained.

The characteristics of the negative electrode material sample thus obtained, such as the pore volume, the degree of circularity, d(002), and Lc of the resulting carbon particles that may be used in the negative electrode for the lithium ion secondary battery, are presented in Table 1.

The degree of circularity was measured by producing a sample electrode as follows. A mixture containing: 97 parts by mass of carbon particles; and 3 parts by mass of polyvinylidene fluoride (PVDF 5% NMP (N-methyl-2-pyrrolidone) dispersion liquid) (manufacturer: Kureha Corporation, product name: PVDF #9305) as an organic binder, was used as a solid component, and a coating material was prepared by adding NMP to the solid component such that the viscosity at 25° C. would be 1600 mPa·s. Subsequently, this was applied on a 10-μm thick copper foil to be a thickness of about 70 μm, and then the coating material was dried for one hour at 120° C. The product thus obtained was used as a sample electrode.

The degree of circularity was determined by embedding the sample electrode in an epoxy resin, subsequently mirror-surface polishing the sample electrode, and making an observation with a scanning electron microscope (VE-7800 manufactured by Keyence Corporation).

The viscosity of the coating material was determined using a viscometer (manufactured by Brookfield Engineering Laboratories, Inc., product name: DV-III (spindle: SC4-18 #14, temperature: 25° C., speed of rotation 100 rpm).

The circumferential length of the equivalent circle and the circumferential length of the particle cross-section image were determined by an analysis program attached to a scanning electron microscope (VE-7800 Observation Application).

(2) Method for Producing Cell for Evaluation

A sample electrode was produced as follows. A mixture containing: 97 parts by mass of carbon particles; and 3 parts by mass of polyvinylidene fluoride (PVDF 5% NMP dispersion liquid) (manufacturer: Kureha Corporation, product name: PVDF #9305) as an organic binder, was used as a solid component, and a coating material was prepared by adding NMP to the solid component such that the viscosity at 25° C. would be 1600 mPa·s. Subsequently, this was applied on a 10-μm thick copper foil to be a thickness of about 70 μm, and then the coating material was dried for one hour at 120° C. The product thus obtained was used as a sample electrode. After the drying, the sample electrode was pressed to be 1.65 g/cm$^3$, and the electrode sample was punched into a circular shape with a diameter of 14 mmϕ for an evaluation of charging capacity, as a sample electrode (negative electrode).

A cell for evaluation was produced by arranging the negative electrode described above and lithium metal to face each other in a CR2016 type coin cell, with a 40-μm thick separator made of polypropylene interposed between the negative electrode and the lithium metal, and injecting an electrolyte liquid therein. For the electrolyte liquid, a solution obtained by adding 0.5% by mass of vinylene carbonate to a solvent mixture of ethyl carbonate (EC) and methyl ethyl carbonate (MEC) at a volume ratio of 3:7, and dissolving $LiPF_6$ to a concentration of 1 mol/L, was used (1 M $LiPF_6$ EC:MEC=3:7 VC 0.5 wt %).

(3) Evaluation Conditions

A sample electrode having an electrode density of 1.65 g/cm$^3$ was used. The conditions for the evaluation of the sample electrode were such that charging was carried out at a constant current of 0.38 mA (0.25 mA/cm$^2$) to 0 V in an atmosphere at 25° C., and subsequently, charging was continued at a constant voltage of 0 V until the current value reached 0.04 mA. Thereafter, discharging was carried out at a constant current of 0.38 mA to reach a voltage value of 1.5 V.

Next, charging was carried out to 0 V at a constant current of 0.38 mA (0.1 C: 0.25 mA/cm$^2$), and the constant current charge capacity at 0.1 C was measured. Discharging was carried out at a constant current of 0.38 mA to reach a voltage value of 1.5 V.

Thereafter, charging was carried out at a constant current of 1.89 mA (0.5 C: 1.2 mA/cm$^2$) to 0 V, and the constant current charge capacity was measured.

The rapid charge capacity ratio was calculated based on the following expression.

$$\text{Rapid charge capacity ratio (\%)} = \frac{\text{Constant current charge capacity at } 0.5C(\text{Ah/kg})}{\text{Constant current charge capacity at } 0.1C(\text{Ah/kg})} \quad [\text{Expression 1}]$$

Examples 2, 3 and 4

The same spheroidized natural graphite as that used in Example 1 was used and was similarly subjected to an isotropic pressure treatment. The graphite was crushed with a cutter mill, and the same carbon particles were obtained. To 1000 g of the carbon particles thus obtained, petroleum pitch (softening point 80° C., carbonization ratio 50%, average particle size 80 μm) was incorporated in an amount of 40 g (Example 2), 120 g (Example 3), or 200 g (Example 4), respectively, and each of the mixtures was mixed at room temperature. The pitch-coated graphitaceous particles thus obtained were heated to 900° C. at a rate of temperature increase of 20° C./h under a nitrogen flow, and thus carbon-coated graphitaceous particles were obtained. The carbon-coated graphitaceous particles thus obtained were passed through a 250-mesh standard sieve, and the particles were used as carbon particles for a negative electrode of a lithium ion secondary battery. The characteristics of the carbon particles for the negative electrode of the lithium ion secondary battery of the respective Examples thus obtained are presented in Table 1.

Example 5

Carbon particles for a negative electrode of a lithium ion secondary battery were obtained in the same manner as in Example 1, except that the same spheroidized natural graphite as that used in Example 1 was filled in a mold and was subjected to a pressure treatment with a single-screw press from the top in a constant direction at 1000 kgf/cm$^2$.

The characteristics of the carbon particles for the negative electrode of the lithium ion secondary battery of the respective Examples thus obtained are presented in Table 1.

Example 6

The same carbon particles as those produced in Example 5 were obtained by subjecting the same spheroidized natural graphite as those used in Example 1 to a pressure treatment in a constant direction, and crushing the graphite with a cutter mill in the same manner as in Example 5. To 1000 g of the carbon particles thus obtained, 200 g of petroleum pitch was respectively incorporated, and the mixture was mixed at room temperature. The pitch-coated graphitaceous particles thus obtained were heated to 900° C. at a rate of temperature increase of 20° C./h under a nitrogen flow, and thus carbon-coated graphitaceous particles were obtained. The carbon-coated graphitaceous particles thus obtained were passed through a 250-mesh standard sieve, and the particles were used as carbon particles for a negative electrode of a lithium ion secondary battery. The characteristics of the carbon particles for the negative electrode of the lithium ion secondary battery of the respective Examples thus obtained are presented in Table 1.

Comparative Example 1

The same experiment was carried out in the same manner as in Example 1, except that the rubber container was not subjected to an isotropic pressure treatment with a hydrostatic pressure press machine. The characteristics of the carbon particles for the negative electrode of the lithium ion secondary battery thus obtained are presented in Table 1.

Comparative Examples 2, 3 and 4

The same experiments were carried out in the same manner as in Examples 2, 3 and 4, respectively, except that the rubber container was not subjected to an isotropic pressure treatment with a hydrostatic pressure press machine. Specifically, to 1000 g of the same spheroidized natural graphite as that used in Example 1, petroleum pitch (softening point 80° C., carbonization ratio 50%, average particle size 80 μm) was incorporated in an amount of 40 g (Comparative Example 2), 120 g (Comparative Example 3), and 200 g (Comparative Example 4), respectively, and each of the mixtures was mixed at room temperature. The pitch-coated graphitaceous particles thus obtained were heated to 900° C. at a rate of temperature increase of 20° C./h under a nitrogen flow, and thus carbon-coated graphitaceous particles were obtained. The carbon-coated graphitaceous particles thus obtained were passed through a 250-mesh standard sieve, and the particles were used as carbon particles for a negative electrode of a lithium ion secondary battery. The characteristics of the carbon particles for the negative electrode of the lithium ion secondary battery of the respective Comparative Examples thus obtained are presented in Table 1.

Comparative Example 5

Flake-shaped graphite (average particle size 35 μm, degree of circularity 0.55, specific surface area 1.1 m$^2$/g) was used for the carbon particles for a negative electrode of a lithium ion secondary battery. The characteristics of these carbon particles are presented in Table 1.

Comparative Example 6

The same spheroidized natural graphite as those produced in Example 1 were obtained by subjecting the same spheroidized natural graphite as that used in Example 1 to an isotropic pressure treatment and crushing the graphite with a cutter mill in the same manner. To 1000 g of the carbon particles thus obtained, 400 g of petroleum pitch was respectively incorporated, and the mixture was mixed at room temperature. The pitch-coated graphitaceous particles thus obtained were heated to 900° C. at a rate of temperature increase of 20° C./h under a nitrogen flow, and thus carbon-coated graphitaceous particles were obtained. The carbon-coated graphitaceous particles thus obtained were passed through a 250-mesh standard sieve, and the particles were used as carbon particles for a negative electrode of a lithium ion secondary battery. The characteristics of the carbon particles for the negative electrode of the lithium ion secondary battery of the respective Examples thus obtained are presented in Table 1.

Comparative Example 7

Flake-shaped graphite (average particle size 26 μm, degree of circularity 0.56, specific surface area 5.0 m$^2$/g) was used for the carbon particles for a negative electrode of a lithium ion secondary battery. The characteristics of these carbon particles are presented in Table 1.

Comparative Example 8

Spheroidized natural graphite (average particle size 20 μm, degree of circularity 0.85, specific surface area 5.0 m$^2$/g, true specific gravity 2.25, Lc>1000 Å, d(002) 3.356 Å, bulk density 0.8 g/ml) was used for the carbon particles for a negative electrode of a lithium ion secondary battery. The characteristics of these carbon particles are presented in Table 1.

INDUSTRIAL APPLICABILITY

According to the present invention, carbon particles for a negative electrode of a lithium ion secondary battery, which have high capacity and have superior rapid charge characteristics, a negative electrode for a lithium ion secondary battery using the carbon particles, and a lithium ion secondary battery can be provided.

The invention claimed is:

1. Carbon particles for a negative electrode of a lithium ion secondary battery, the carbon particles having a pore volume of pores having a size of 2×10 to 2×10$^4$ Å, of 0.07 ml/g or less with respect to the mass of the carbon particles; having an interlayer distance d(002) of a graphite crystal as determined by an X-ray diffraction analysis, of 3.38 Å or less; having a crystallite size Lc in the C-axis direction of 500 Å or more; and having a degree of circularity of the particle cross-section in the range of 0.6 to 0.9.

2. The carbon particles for the negative electrode of the lithium ion secondary battery according to claim 1, wherein the carbon particles have an exothermic peak at a temperature in the range of 550° C. or higher to 650° C. or lower in a differential thermal analysis in an air stream, and have a peak area in the range of 100 μV·s/mg or larger to 2100 μV·s/mg or smaller at a rate of temperature increase of 5° C./min.

3. The carbon particles for the negative electrode of the lithium ion secondary battery according to claim 1, wherein the average particle size as measured with a laser diffraction type particle size distribution analyzer is in the range of 1 to 100 μm.

4. The carbon particles for the negative electrode of the lithium ion secondary battery according to claim 1, wherein the N$_2$ specific surface area as determined by a nitrogen adsorption analysis at 77 K is 10 m$^2$/g or less.

5. The carbon particles for the negative electrode of the lithium ion secondary battery according to claim 1, wherein the bulk density is 0.7 g/ml or greater.

6. The carbon particles for the negative electrode of the lithium ion secondary battery according to claim 1, wherein the true specific gravity is 2.2 or greater.

TABLE 1

| Items | Pore volume (ml/g) | Degree of circularity | d(002) (Å) | Lc (Å) | DTA peak area (μV · s/mg) | Average particle size (μm) | Specific surface area (m$^2$/g) | Bulk density (g/ml) | True specific gravity | Ratio of rapid charge capacity (%) |
|---|---|---|---|---|---|---|---|---|---|---|
| Example 1 | 0.087 | 0.87 | 3.354 | >1000 | 0 | 22 | 5.0 | 1.1 | 2.25 | 58.5 |
| Example 2 | 0.070 | 0.83 | 3.359 | >1000 | 267 | 22 | 2.3 | 1.2 | 2.24 | 61.4 |
| Example 3 | 0.043 | 0.88 | 3.359 | >1000 | 1193 | 23 | 1.1 | 1.2 | 2.24 | 62.8 |
| Example 4 | 0.024 | 0.85 | 3.364 | >1000 | 2040 | 24 | 0.5 | 1.2 | 2.23 | 64.3 |
| Example 5 | 0.081 | 0.85 | 3.352 | >1000 | 0 | 22 | 5.1 | 1.2 | 2.25 | 59.5 |
| Example 6 | 0.024 | 0.83 | 3.366 | >1000 | 2034 | 25 | 0.5 | 1.2 | 2.23 | 64.0 |
| Comparative Example 1 | 0.164 | 0.95 | 3.354 | >1000 | 0 | 22 | 5.0 | 1.0 | 2.25 | 3.0 |
| Comparative Example 2 | 0.151 | 0.96 | 3.359 | >1000 | 283 | 22 | 2.8 | 1.2 | 2.24 | 20.1 |
| Comparative Example 3 | 0.127 | 0.96 | 3.360 | >1000 | 1302 | 23 | 1.5 | 1.2 | 2.23 | 35.3 |
| Comparative Example 4 | 0.110 | 0.93 | 3.360 | >1000 | 1979 | 24 | 1.0 | 1.2 | 2.22 | 40.8 |
| Comparative Example 5 | 0.101 | 0.55 | 3.353 | >1000 | 0 | 35 | 1.1 | 1.1 | 2.23 | 53.1 |
| Comparative Example 6 | 0.061 | 0.95 | 3.369 | >1000 | 2863 | 26 | 0.2 | 1.0 | 2.22 | 42.7 |
| Comparative Example 7 | 0.081 | 0.56 | 3.357 | >1000 | 0 | 26 | 5.0 | 0.4 | 2.25 | 28.7 |
| Comparative Example 8 | 0.130 | 0.85 | 3.356 | >1000 | 0 | 20 | 5.0 | 0.8 | 2.25 | 5.8 |

7. A negative electrode for the lithium secondary battery, comprising the carbon particles for the negative electrode of the lithium ion secondary battery according to claim 1.

8. A lithium ion secondary battery, comprising the negative electrode according to claim 7 and a positive electrode containing a lithium compound.

9. Carbon particles for a negative electrode of a lithium ion secondary battery, the carbon particles having a pore volume of pores having a size of $2 \times 10$ to $2 \times 10^4$ Å, of 0.07 ml/g or less with respect to the mass of the carbon particles; having an interlayer distance d(002) of a graphite crystal as determined by an X-ray diffraction analysis, of 3.38 Å or less; having a crystallite size Lc in the C-axis direction of 500 Å or more; and being configured to have, in a state of being produced into a negative electrode for a lithium ion secondary battery, a degree of circularity of the particle cross-section in the range of 0.6 to 0.9.

10. The carbon particles for the negative electrode of the lithium ion secondary battery according to claim 9, wherein the carbon particles have an exothermic peak at a temperature in the range of 550° C. or higher to 650° C. or lower in a differential thermal analysis in an air stream, and have a peak area in the range of 100 μV·s/mg or larger to 2100 μV·s/mg or smaller at a rate of temperature increase of 5° C./min.

11. The carbon particles for the negative electrode of the lithium ion secondary battery according to claim 9, wherein the average particle size as measured with a laser diffraction type particle size distribution analyzer is in the range of 1 to 100 μm.

12. The carbon particles for the negative electrode of the lithium ion secondary battery according to claim 9, wherein the N2 specific surface area as determined by a nitrogen adsorption analysis at 77 K is 10 $m^2$/g or less.

13. The carbon particles for the negative electrode of the lithium ion secondary battery according to claim 9, wherein the bulk density is 0.7 g/ml or greater.

14. The carbon particles for the negative electrode of the lithium ion secondary battery according to claim 9, wherein the true specific gravity is 2.2 or greater.

15. A negative electrode for the lithium secondary battery, comprising the carbon particles for the negative electrode of the lithium ion secondary battery according to claim 9.

16. A lithium ion secondary battery, comprising the negative electrode according to claim 15 and a positive electrode containing a lithium compound.

* * * * *